(12) United States Patent
Olson

(10) Patent No.: US 6,832,790 B2
(45) Date of Patent: Dec. 21, 2004

(54) WATER TIGHT THREE PIECE COUPLING FOR ELECTRICAL CONDUITS

(76) Inventor: Mark H. Olson, 3764 Fairfax Way, South San Francisco, CA (US) 94080

( * ) Notice: Subject to any disclaimer, the term of this patent is extended or adjusted under 35 U.S.C. 154(b) by 0 days.

(21) Appl. No.: 10/421,613

(22) Filed: Apr. 23, 2003

(65) Prior Publication Data

US 2004/0108721 A1 Jun. 10, 2004

Related U.S. Application Data

(60) Provisional application No. 60/431,695, filed on Dec. 9, 2002.

(51) Int. Cl.$^7$ ................................. F16L 19/00
(52) U.S. Cl. ............... 285/354; 285/151.1; 285/388
(58) Field of Search .................... 285/354, 392, 285/387, 388, 149.1, 151.1

(56) References Cited

U.S. PATENT DOCUMENTS

| | | | | |
|---|---|---|---|---|
| 896,204 A | * | 8/1908 | Glauber | 285/354 |
| 1,460,154 A | * | 6/1923 | Frazier et al. | 285/354 |
| 2,354,538 A | * | 7/1944 | Parker | 285/354 |
| 2,511,158 A | * | 6/1950 | Gray | 285/354 |
| 2,532,669 A | * | 12/1950 | Jones | 285/354 |
| 2,837,351 A | * | 6/1958 | Bailey | 285/354 |
| 3,712,583 A | * | 1/1973 | Martindale et al. | 285/354 |
| 4,258,936 A | | 3/1981 | Goldberg | |
| 4,549,756 A | | 10/1985 | Basile | |
| 4,582,347 A | * | 4/1986 | Wilcox et al. | 285/354 |
| 4,592,574 A | | 6/1986 | Vollmuth et al. | |
| 4,595,217 A | * | 6/1986 | Siegel | 285/354 |
| 4,957,314 A | | 9/1990 | Basile et al. | |
| 5,362,109 A | * | 11/1994 | Pacht | 285/388 |
| 6,557,905 B2 | * | 5/2003 | Mack et al. | 285/388 |

* cited by examiner

Primary Examiner—David Bochna
(74) Attorney, Agent, or Firm—Joseph L. Strabala, Esq.

(57) ABSTRACT

In a three piece coupling which has bushing with internal and external threads for assembly on a threaded end of a conduit by its internal threads, a sleeve adapted to fit over a second conduit to be joined by the coupling with internal threads operable to engage the external threads of the bushing to advance the sleeve on the bushing when it is rotated and a collar sized to fit within the sleeve without restricting its rotation, the collar having internal threads for assembly on a threaded end of the second conduit to be connected with the coupling and retained in the sleeve so that the collar is advanced with the sleeve, the improvement including a first seal operable to effect a water tight seal between the bushing and the sleeve and a second seal operable to effect a second water tight seal between the sleeve and a conduit connected to the collar by mechanical compression whereby the coupling joins the conduit components in a water tight joint without rotating the components and without losing conductivity through the coupling.

8 Claims, 4 Drawing Sheets

WATER TIGHT THREE PIECE COUPLING FOR ELECTRICAL CONDUITS

This application claims the benefit of Provisional Application No. 60/431,695, filed Dec. 9, 2002.

BACKGROUND OF THE INVENTION

In thick walled metal conduit, especially two inches in diameter and above, threads are often provided on the ends of the conduit units or sections which come in lengths from 10 to 20 feet. Threads on the ends of the conduit units enable them to be joined together end-to-end or to other components, such as elbows and electrical boxes, in electrical systems.

Particularly in metal conduits of sizes 2 inches and larger it is difficult to manipulate the conduit units and align them for end-to-end connections or for connection to other components, such as elbows or the like, in an electrical system. Moreover if a conventional union, a sleeve which has internal threads, is used to connect the threaded ends, the conduit units must be rotated relative to one another to screw them into the union. In some situations it is not possible to rotate conduit units relative to other components in the system.

Further if unions are used, it difficult to disassemble such an electrical system for upgrade and or repair as the conduits must be unscrewed.

Due to the above difficulties, it has become common practice to use what is known in the trade as a three piece coupling to join the threaded ends of a conduit unit with other conduit units end-to-end or to other threaded components in an electrical system. These fittings have a threaded bushing, with internal and external threads, which is screwed onto a threaded end of one of the conduit units. The second element is a sleeve which slips onto the end of the other conduit unit, after which the third element, a threaded collar, is screwed on the end of this conduit unit. The bore in the sleeve is large enough to allow the sleeve to pass over the collar but includes a rim at its opposite end that engages this collar preventing it from passing through the sleeve. As the end of the sleeve which passes over the collar includes internal threads, it can be advanced and screwed onto the external threads of the threaded bushing by rotating the sleeve without rotating either conduit unit. As the sleeve advances on the threaded bushing its rim will engage the collar and pull the ends of the conduit units together.

Such three piece units, described in *National Electrical Code Handbook* which is published every three years, develop a satisfactory mechanical joint and enable assembly in confined spaces, which accounts for the broad use in the filed. There are variation in the design of such units, such as those illustrated in U.S. Pat. No. 4,258,936 issued to Goldberg, U.S. Pat. No. 4,549,765 issued to Basile and U.S. Pat. No. 4,592,574 issued to Vollmuth et al, all of which devices use a sleeve associated with one of the conduit units which is rotated to screw it onto the threads of a bushing on the other conduit unit without rotating either of the conduit units. U.S. Pat. No. 4,957,413 issued to Basile, et al, teaches a two piece coupling unit that has set screws engaging a groove to lock the elements screwed onto the conduit units together, which is generally not commercially available because there is no way to mechanically pull the conduit units together so the set screws can be properly engaged in the groove, with the exception of smaller conduit installations, i.e., employing conduits one inch or less in diameter.

In the above referenced handbook the specification for couplings, such as the three piece coupling, in Section 848-7 are "Couplings and Connectors. Couplings and connectors used with tubing shall be made up tight. Where buried in masonry or concrete they shall be concrete tight. Where installed in wet locations they shall be the raintight type."

Applicant, an electrical contractor, has tested the commercially available three piece couplings for larger size conduits by closing off one end or a short piece of conduit and joining another piece of conduit to it with such couplings. Thereafter, when submerging the short piece of conduit and coupling in a pail of water, the joint leaked and the conduit filled with water.

In part, water ingress results from variations in the outside diameter of the conduits and variations in the inside diameter of the couplings, which in larger conduit size installations can result in gaps in the range of 0.060 inch (or more) between the conduit and the coupling parts. Moreover the three piece couplings must have enough tolerance to allow the unit to be used, requiring a somewhat sloppy fit between its components because conduit units do not perfectly align with one another in the field. In addition these couplings, even when aggressively tightened cannot bring the ends of the conduit units in to a sealing contact with each other due to variations in the ends of the conduit units, alignment, etc.

On the roofs on commercial buildings, exterior walls and in industrial plants threaded conduit units are installed with three piece couplings which are not raintight even though the specifications for these installations, more often than not, require that the threaded couplings be "listed" as raintight.

While rain water is essentially distilled water with few impurities, once it contacts a metal conduit it dissolves metal atoms, along with other impurities, and becomes conductive when it enters the interior of such conduits through a coupling which is not raintight. As such water passes through the interior of the conduit system it dissolves impurities and may short out electrical circuits, switch gear and the like. Of course corrosion from the intrusion of the rain water compromises such installations still further.

An object of the current invention is to provide an improved three piece coupling which is raintight and can be used in wet locations, including being buried in the ground where it is likely to be in contact with ground water.

Another object is the provision of a three piece coupling that is raintight and insures electrical continuity through the coupling.

Still a further object is the provision of a raintight three piece coupling which is economical to manufacture and competitive with existing non-raintight couplings of this type.

SUMMARY OF THE INVENTION

A water tight three piece coupling for joining threaded components, such as electrical conduits, without the need to rotate such components relative to each other, includes (1) a bushing having internal threads for assembly with the threaded end of a conduit and external threads along with a boss having a diameter larger than its external threads formed on the bushing, (2) a sealing member disposed with the boss, (3) a sleeve having internal threads at one end operable to mate with said external threads of the bushing whereby sleeve can be screwed on to the bushing and a lip on the sleeve which extends beyond its internal threads and operable to engage the sealing member on said boss to effect a seal between sleeve and the bushing, (3) a collar having internal threads sized to fit within the sleeve without restricting rotation of the sleeve, the collar engaging an internal end of said sleeve without the internal threads whereby the collar is advanced with the sleeve and (4) sealing means associated with end of the sleeve without the internal threads operable to seal the sleeve to a conduit connected to the collar through its internal threads in the coupling.

BRIEF DESCRIPTION OF THE DRAWINGS

Prior Art

PRIOR ART

Figure 1:
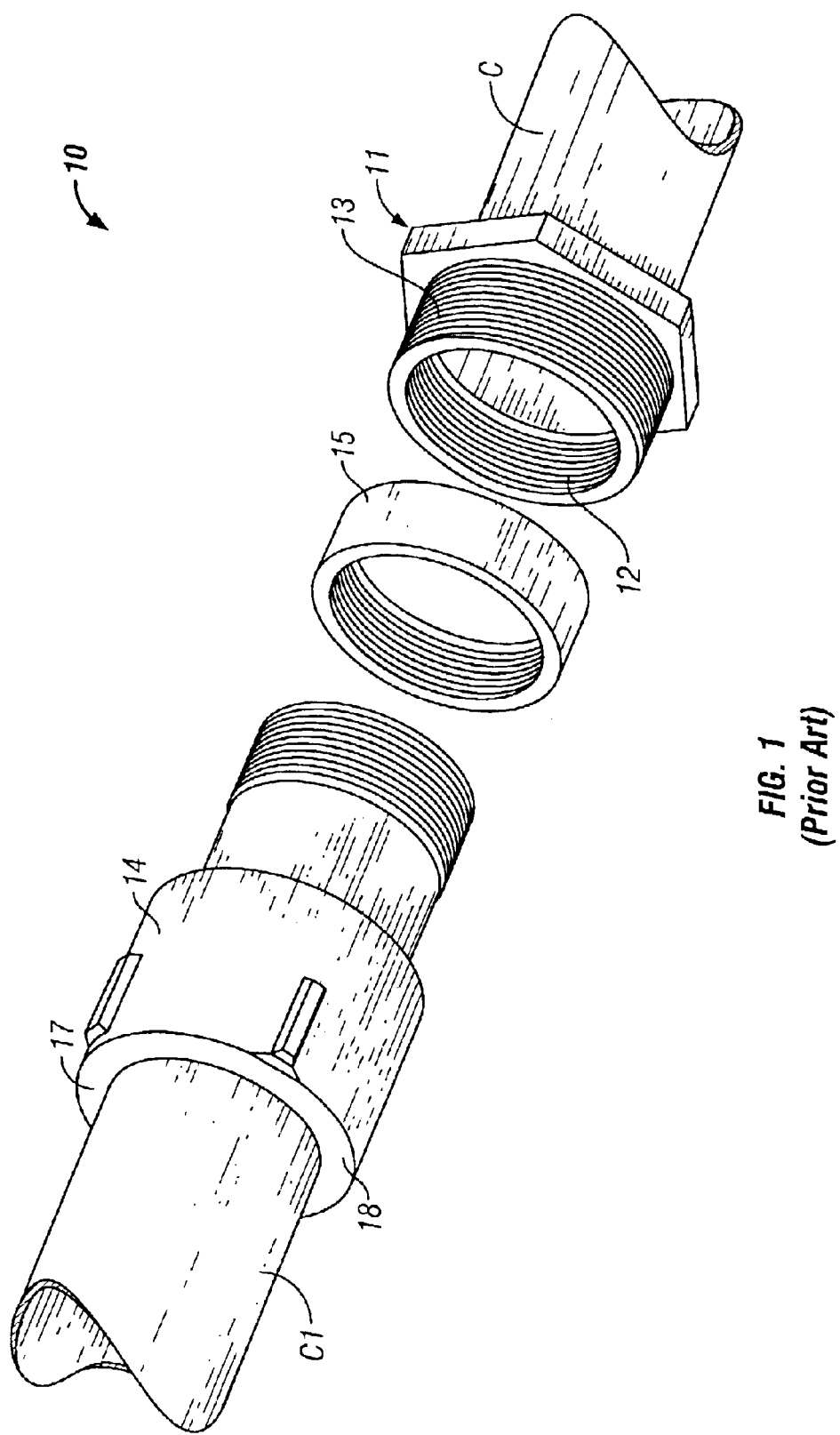
FIG. 1 is an exploded perspective of the prior art three piece coupling which is in wide use in electrical conduit installations.

A prior art three piece coupling 10 used to join the threaded ends of conduit units end-to-end or to other threaded components in an electrical system is shown in FIG. 1. Such a fitting has a threaded bushing 11, with internal threads 12 and external threads 13, which is screwed onto a threaded end on a conduit C using its internal threads. The second element is a sleeve 14 which slips onto the end of the other conduit unit C1, after which the third element, a secondary bushing or collar 15, is screwed on the end of this conduit unit. The bore (not shown) in the sleeve is large enough to allow the sleeve to pass over the collar but includes a rim at its opposite end that engages this collar. As the end of the sleeve which passes over the collar includes internal threads (not shown), it can be screwed onto the external threads 13 of the threaded bushing by rotating the sleeve without rotating either conduit unit. As the sleeve advances on the threaded bushing its internal rim will engage the collar and drive or pull the ends of the conduit units C and C1 together.

BRIEF DESCRIPTION OF THE INVENTION

Figure 2:
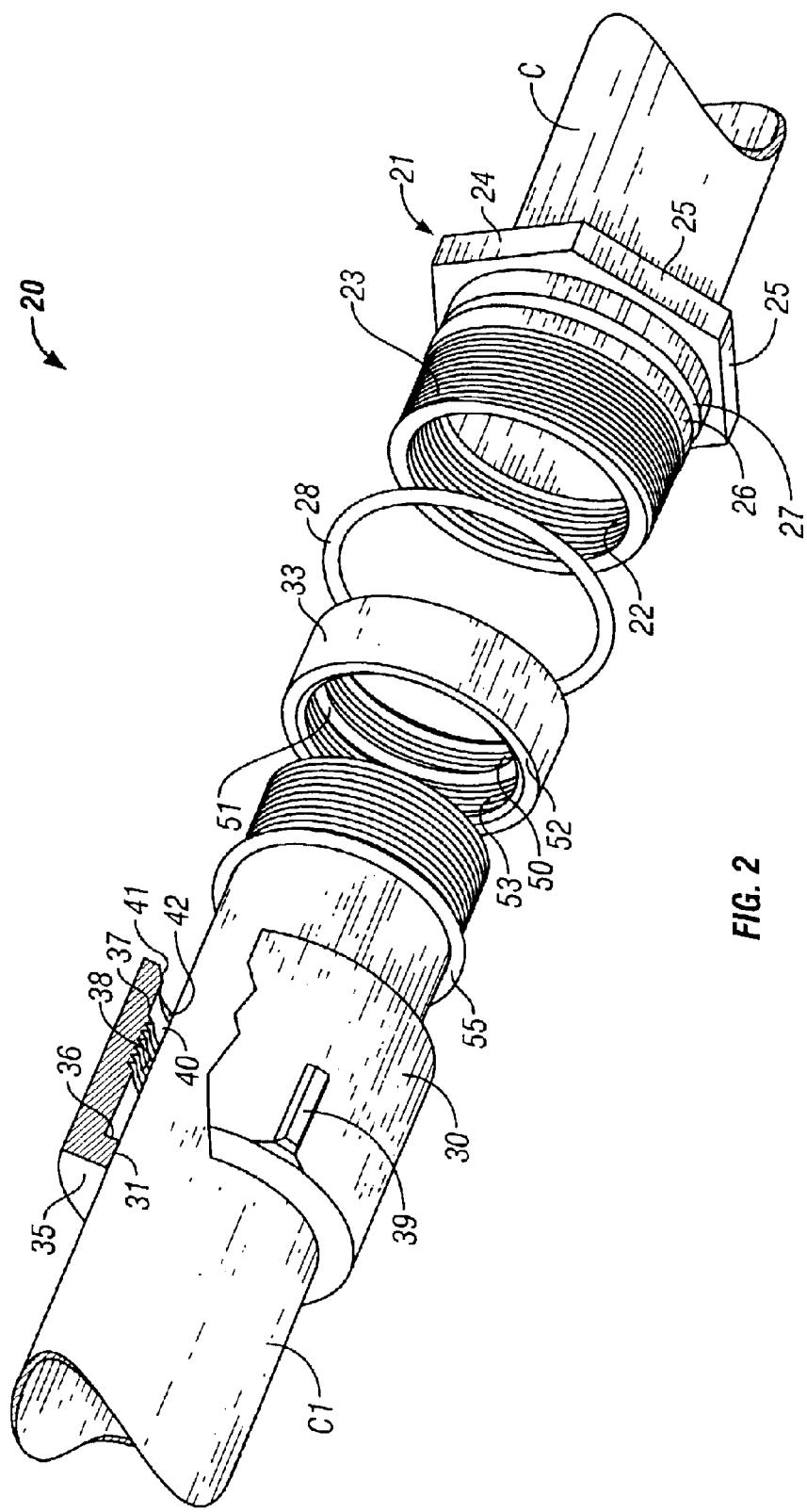
FIG. 2 is an exploded perspective with parts broken away of the novel three piece coupling of this invention, with parts broken away to better illustrate the detail.
Figure 3:
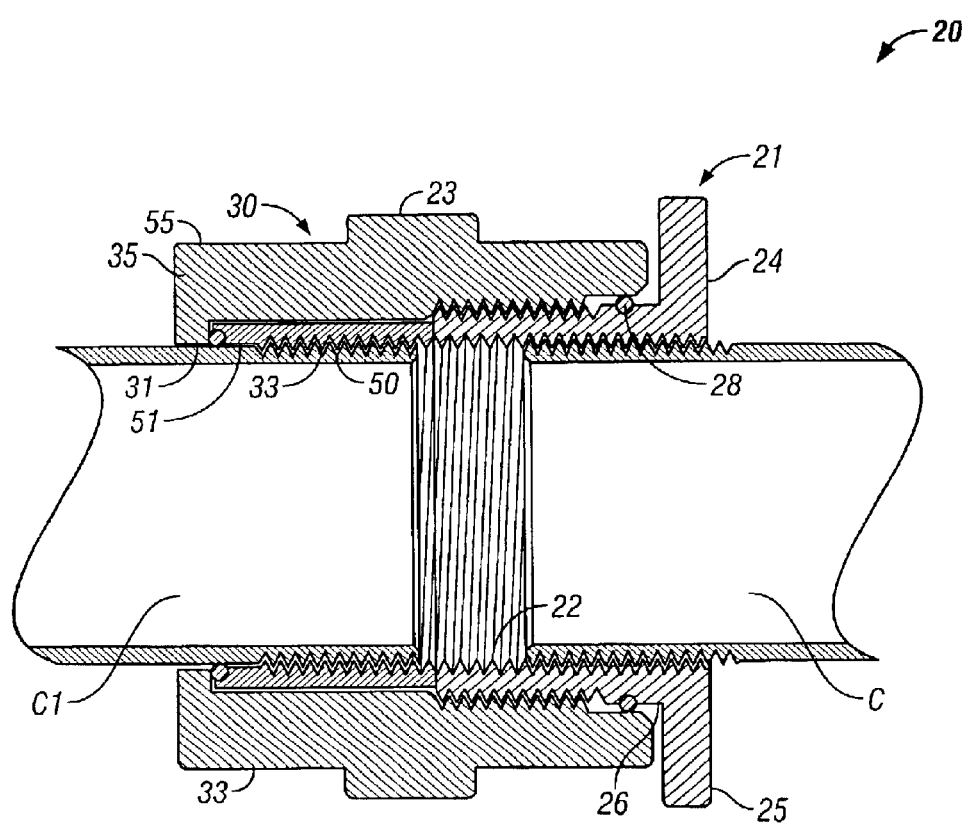
FIG. 3. is a section of the novel three piece coupling of this invention shown in FIG. 2.

FIG. 2 and FIG. 3 illustrate a fitting 20 which is a useful embodiment of the invention. Basically this fitting consists of three principal parts, one of which is a threaded bushing 21 with internal threads 22 for connecting it to a threaded end of a conduit C, and external threads 23 for closing the fitting or coupling, as can be seen in the several figures. Like the similar bushing in the prior art it has a radial extending flange 24 which is fashioned with wrench flats 25 but unlike the threaded bushings in the prior art, this bushing has a boss 26 between the flange and the external threads which has a diameter larger than that of the external threads; this boss includes a groove 27 for receiving an O-ring 28 in the central portion of the boss.

As can be seen in the drawings, FIGS. 2 and 3, the second major component of fitting 20, is a specially constructed sleeve 30. This sleeve includes four stepped, concentric bores, the first of which, bore 31, sized so that the sleeve can be slid onto a conduit unit for which the fitting is designed in a loose fitting relationship. The second bore 32 in the sleeve is larger in diameter than the first bore so that it can loosely receive the third major component of the fitting, collar 33, in the sleeve in a manner that the sleeve can rotate relative the collar. Due to the larger diameter of the second bore, a rim 34 is formed at the intersection of the bores at one end 35 of the sleeve. As the bore 31 is smaller than the diameter of the collar the rim will engage the end 36 of the collar. The third bore 37 of the sleeve which is larger in diameter than the second bore includes internal threads 38 which are sized to mate the external threads 23 of the threaded bushing. The forth stepped bore is bore 40 located at the mouth 41 of the sleeve, which is the largest in diameter and includes a smooth inner surface and a bevel 42 around the mouth. On the outside of the sleeve, lugs 39 are provided for a wrench used to rotate the sleeve when the coupling is assembled.

As is best illustrated in FIG. 3, when the mouth 41 of sleeve 30 passes over the boss 26 it engages the O-ring 27. As the sleeve advances further on the threaded bushing 20 the bevel 42 at the mouth of the sleeve will facilitate the largest bore 40 of the sleeve sliding over the O-ring, forming a water tight seal between the sleeve and the threaded bushing at this end of the sleeve. While the invention does not require an o-ring be used between the sleeve and the boss, o-rings are preferred as they accommodate significant dimensional variations in these components without loss of a seal. Also it should be appreciated that the in place of the boss and O-ring seal described, a groove [not shown] can be provided in the threads 23 of the bushing and a nylon insert placed in this groove which is slightly higher than the threads. Using this alternate, the internal threads 38 of the sleeve will bite into the nylon and form a seal between the sleeve and the bushing. Alternatively the groove and nylon insert can be placed in the internal threads of the sleeve.

The collar 33 which includes internal threads 50, is similar to those collars used in the prior art, but is modified to have an extended portion 51 which has no internal threads. This extended portion extends axially past the threads of the conduit unit C1 on which the collar is assembled by its internal threads, as can be seen in FIG. 3. The distal end 52 of the extended portion of the collar includes a bevel 53 about its opening 54 which is designed to mate with an O-ring 55 to effect a seal between conduit unit C1 and the sleeve when its rim 34 abuts against O-ring 55 and pushes it into the bevel to compress the o-ring between the sleeve and the conduit C1, as shown in FIG. 3.

FIG. 2 illustrates how the fitting 20 is assembled in the field on coaxially aligned conduits units C and C1. As can be seen in FIG. 2 the threaded bushing 21 is assembled on conduit unit C by mating its internal threads 22 with the threads on the end of the conduit unit. Since the conduit unit's threads and the internal threads of the bushing are normal pipe threads [NPT] which are tapered to create an interference fit when screwed together, the threaded bushing is tightened until it is sealed to the conduit unit in a water tight joint. Thereafter O-ring 28 is placed in the groove 27 of the boss 26 on the threaded bushing.

Next the sleeve 30 is slipped on to the conduit unit C1 being joined with the fitting 20 as shown in FIG. 2, and thereafter O-ring 55 is slipped onto this conduit unit as also illustrated in FIG. 2. Once these parts are in position the internal threads 50 of the collar 33 are screwed onto the threads of the conduit C1 thereby securing both the sleeve and the O-ring on this conduit. Typically these threads are also NPT threads.

With the coupling parts so assembled the ends of the several conduits, C and C1, are brought into close enough proximity that the internal threads 38 of sleeve 30 engage the external threads 23 on the threaded bushing 21. By rotating the sleeve it is advanced on the threaded bushing and its mouth 41 passes over the boss 26 and engages O-ring 28 which slides into the bore 40 as the sleeve is further advanced, sealing this end of the sleeve with the threaded bushing. As the sleeve is advanced on the bushing its rim 34 engages the O-ring 55 and the distal end 52 of the collar 33 pulling conduit C1 with the sleeve As the sleeve advances on the external threads of the threaded bushing its rim 34 will also compress O-ring 55 into the bevel 53 of the collar 33 sealing that end of the sleeve with conduit unit C1. If desired a washer (not shown) can be placed between the radial face or the rim and the O-ring to lessen the chaffing action against the O-ring as the sleeve is rotated to join the parts of the coupling. If desired, in place of the O-ring, a preformed seal can be incorporated in the collar on the end that abuts on the rim In FIG. 4, an alternative embodiment of the invention, fitting 60 is shown which uses the same threaded bushing 21 as previously described but effects an o-ring seal between its sleeve 61 and the conduit C1 by using an annular ring element 62 joined to the end 63 of the sleeve by bolts 64. In this embodiment the same four stepped, co-axial bores are employed in the sleeve. The smaller bore 65 at end 63 of the sleeve is adapted to slip over conduit C1. In this embodiment a bevel 66 is formed about the periphery of this bore as can be seen in FIG. 4 so that an O-ring 67 can be forced into the bevel by the annular ring element 62 when the bolts pull the ring against the end of the sleeve to seal the sleeve with conduit C1.

As the seal between the end of the sleeve 61 and the conduit unit C1 is formed at the exterior end of the sleeve, the collar 70 of the fitting 60 need only be a simple collar threaded onto the end of the conduit unit C1 by employing its internal threads 71 and sized so its outside diameter [OD] is loosely received in the next larger bore 72 in the sleeve.

Like the previously described sleeve, the third bore 73 in sleeve 61 is of a larger diameter than that of the second co-axial bore 72, includes internal threads 73A, which are adopted to mate with external thread 23 on the threaded bushing 21. Also the largest co-axial bore 74 in this sleeve is sized to fit over the boss 26 on the threaded bushing and has a bevel 75 at the mouth 76 of the sleeve to assist it in sliding over the o-ring 28 in a sealing relationship.

Figure 4:
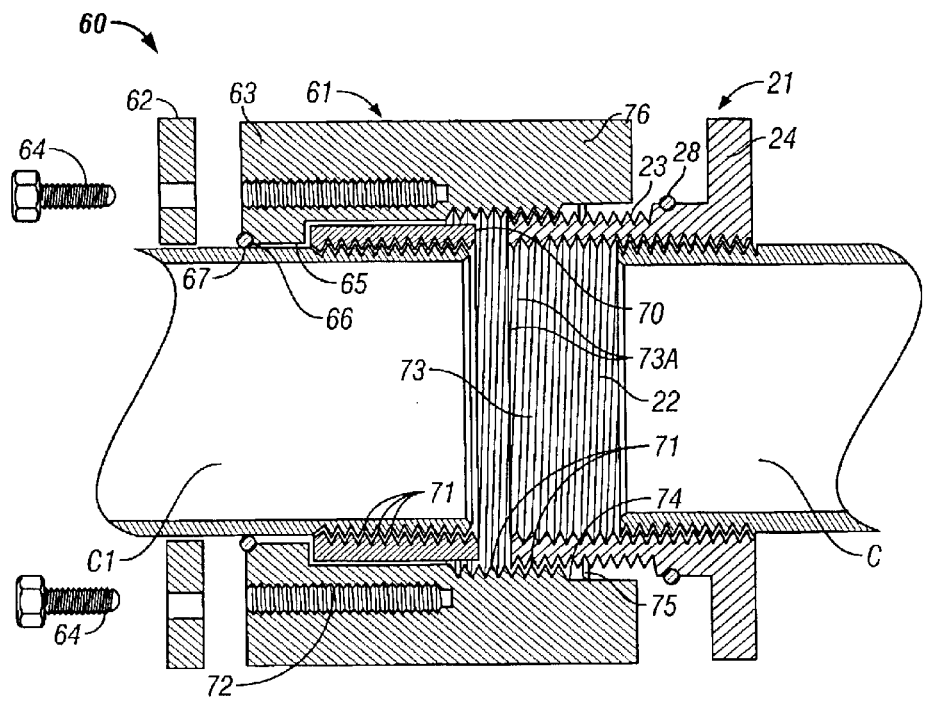
FIG. 4. Is an alternate embodiment of the novel three piece coupling of this invention in section.
Figure 5:
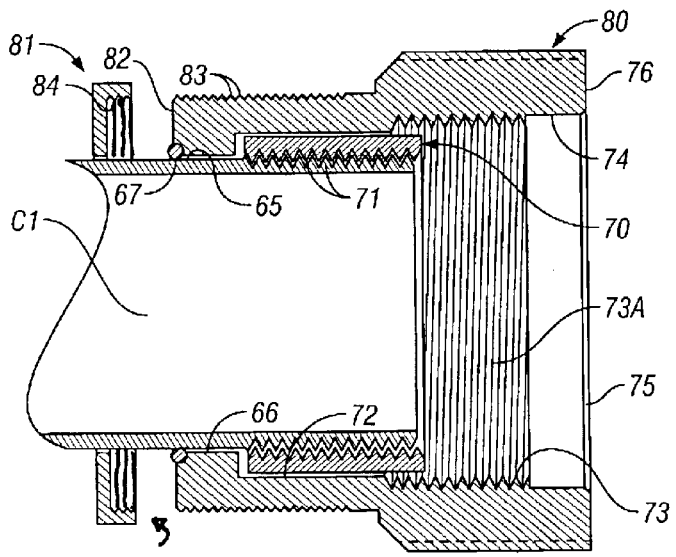
FIG. 5 is still another alternate embodiment of the novel three piece coupling illustrated in FIG. 5 using a nut to effect a seal verses the annular ring shown in FIG. 4.

In FIG. 5 illustrating still a further embodiment of the invention, the modified sleeve 80 and its apertured nut 81 are shown, with the apertured nut replacing the ring element 62 in the embodiment shown in FIG. 4. In this embodiment the end 82 of the sleeve includes external threads 83 on which the internal threads 84 of the nut can be assembled to drive the O-ring 67 into a bevel 66 formed about the periphery of the smaller bore 65 of the four co-axial bores in the sleeve. These bores are that same as those described for the embodiment in FIG. 4 and it is un-necessary to describe them again since they are identified with the same numerals in both FIG. 4 and FIG. 5. As the nut is tightened on the end of the sleeve it can be appreciated that the same sealing action is obtained as with the annular ring element 62.

While not shown, other types of nuts and thread arrangements can be used on the end of the sleeves of this fitting, in place of the simple annular nut illustrated in FIG. 5. For example, nuts and threads using a interrupted screw arrangement (not shown) can be employed which require only a quarter or half turn on the nut to properly seat the O-ring 67 as described above. Such quick locking nuts save labor without sacrificing structural integrity of the seal.

While the specification has referred the fitting 20 as to a three piece coupling, this is in reference to its major components, and is not intended to restrict it to fitting having only three pieces as it includes other components, such as O-rings and the like, as well as subassemblies, such as annular nuts and or rings to effect one of the seals at the end of the various sleeves.

While not shown in the drawings, it is possible to place an elastomer band in a groove cut into the external threads 23 of the bushing 21 which band would be engaged by the internal threads 38 of the sleeve 30 to effect a water tight seal.

Having described my invention, I claim:

1. An improved, water tight three piece coupling having a bushing with internal and external threads for assembly on a threaded end of a conduit with its internal threads, a sleeve adapted to fit over a second conduit to be joined with said coupling with internal threads operable to engage said external threads of said bushing to advance the sleeve on said bushing when it is rotated and a collar sized to fit within said sleeve without restricting its rotation, said collar having internal threads adopted for assembly on a threaded end of the second conduit to be connected with said coupling, the improvement comprising:

first sealing means operable to effect a water tight seal between said bushing and said sleeve as a result of mechanical comprising of said first sealing means by said sleeve as it advances on said bushing; and second sealing means operable to effect a water tight seal between said sleeve and a conduit connect to said collar as a result of mechanical compression of said second sealing means by said sleeve as it advances on said bushing.

2. The improved water tight three piece coupling defined in claim 1 wherein the first sealing means includes an o-ring disposed between the sleeve and the bushing.

3. The improved water tight three piece coupling defined in claim 1 when first sealing means includes a circular lip at the mouth of the sleeve extending beyond its threads and the bushing includes a boss with an o-ring centrally disposed therein, which o-ring engages said circular lip to effect a seal between said sleeve and said bushing when said sleeve is screwed on to said bushing.

4. The improved water tight three piece coupling defined in claim 1 where in the second sealing means includes an o-ring disposed between the sleeve and conduit connected to the collar.

5. The improved water tight three piece coupling defined in claim 4 wherein the second sealing means includes means operable to compress the o-ring between the sleeve and conduit connected to the collar to effect a water tight seal.

6. A water tight three piece coupling for joining threaded components without the necessity of rotating such components comprising;

a bushing means having internal threads for assembly with the threaded end of component joined with said coupling and external threads for joining said coupling, said bushing having a sealing member disposed on its outer surface;

a sleeve means having internal threads at one end, said threads operable to mate with said external threads of said bushing means whereby said sleeve can be screwed on to said bushing means, said sleeve means having means to engage said sealing member to effect a seal between said sleeve means and said bushing means through mechanical compression of said sealing member by said sleeve;

a collar means with internal threads sized to fit within said sleeve means without restricting rotation of said sleeve means, said collar means engaged by the end of said sleeve means without said internal threads; and sealing means associated with said end of said sleeve means without said internal threads operable to seal said sleeve means to a conduit connected to said collar means in said coupling in a water tight seal through mechanical compression of said sealing means by said sleeve.

7. The improved water tight three piece coupling defined in claim 6 wherein the sealing member includes an o-ring.

8. The improved water tight three piece coupling defined in claim 6 when in the sealing means is an o-ring and includes means to compress the o-ring between the sleeve and a conduit connected to the collar in the coupling.

* * * * *